UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF OBTAINING TITANIC OXID.

1,206,796.

Specification of Letters Patent.  Patented Dec. 5, 1916.

No Drawing.   Application filed March 7, 1916.  Serial No. 82,557.

*To all whom it may concern:*

Be it known that I, LOUIS E. BARTON, a citizen of the United States, and a resident of Niagara Falls, in the county of Niagara and State of New York, have invented certain new and useful Improvements in Methods of Obtaining Titanic Oxid, of which the following is a specification.

My present invention relates to the obtaining of titanic oxid concentrates from titaniferous and ferruginous substances, such, for example, as ilmenite ores, and more particularly to such methods for so doing as are disclosed in Letters Patent, granted to Auguste J. Rossi and myself, Nos. 1,106,409 and 1,106,410, dated August 11, 1914, and No. 1,171,542, dated February 15, 1916.

The objects of my present invention comprise provision of novel steps in the practice of such, or similar, methods, whereby their final products are attainable more readily and economically, often more abundantly, and of more desirable quality for certain purposes.

Reference to the said Letters Patent will fully disclose the methods, processes and product therein described and claimed, which may, for the purposes of this specification, be summarized as follows, viz: The titaniferous-ferruginous substances treated, such, for example, as ordinary titaniferous, or ilmenite, ores, were melted in the presence of sulfid of an alkali metal either charged as such, or produced by reactions in the charge, during its melting, from therewith mixed carbonaceous material and sulfate of an alkali metal. The resulting melt was then, either preferably after, or without, lixiviation with water, heated in a bath containing an acid solvent of iron, so dilute as to dissolve the therein iron, and other, compounds, rather than those of titanium; and finally the insoluble residues being withdrawn were washed, dried, and, if desired, calcined, the resulting, usually powdered, product being, prior to calcination, darkish to light gray in color, or, if calcined, yellowish, and distinguished, by analysis, as consisting principally of titanic oxid, the percentage of which is somewhat increased by calcination, and as containing, also, some soda and sulfuric anhydrid, and a relatively small quantity of iron oxid,—one of the most notable and useful distinguishing characteristics of said products being the exceptional ease, rapidity, and completeness with which they are soluble in concentrated sulfuric, or other, acids. My present invention is based upon my discovery that the reactions required by the said processes can be brought about at much lower temperatures than requisite to insure the hitherto practised fusion of the charge. I accordingly obtain the same, or in some respects better, final results by substantially following the said processes with the exception that instead of melting the charge, I subject it to temperatures below that of its fusion, but sufficient to insure formation of ferro-sodium sulfid and titanate of the alkali metal. By this variation in procedure, the charge, during this stage of the operation, is, as it were, sintered, instead of being melted, and advantageously retains, during the furnacing and thereafter, a loose granular form, instead of the compact and dense consistency of the previously practised melts.

Among other advantages distinguishing my present invention, may be noted the economy resulting from its dispensing with the carbon-brick furnace linings formerly required,— ordinary fire-brick and iron withstanding satisfactorily its lower temperatures; also its dispensing with formerly required crushing, or wet-milling of the furnace products; also its being better adapted to operation in a revolving-kiln furnace whereby the mechanical handling of the charge is advantageously facilitated, etc.

In practising my present method, I prefer niter cake to salt cake, as the contributer of alkali sulfate, because of the relatively greater proportion of sulfur introduced by the former, which, I believe, facilitates formation of ferro-sodium sulfids. As the carbonaceous reducing agent I prefer, in a muffle or closed type of furnace, charcoal, not only on account of its purity, but also because its relatively greater volume, per unit weight, assists in desirably maintaining the charge in loose granular condition. In a revolving kiln furnace, where fire gases contact with the charge, I prefer a coking bituminous coal, because the coking tends, though not unduly, to bind fine loose particles into conglomerations less likely to be carried away by the blast, and the volatile combustible matter given off from such coal assists in maintaining the required reducing atmosphere. Other carbonaceous materials may, however, of course, be used.

While the procedures of my present process are, as regards separation of titanic, from iron, oxids, through formation of ferro sodium sulfid, subsequent treatment with acid, etc., substantially similar to those of the above referred to previous processes, I believe that the chemical reactions are somewhat modified by the difference in the respective temperatures employed. For example, by my present sintering process less alkali titanate appears to be formed, which is desirable in that it correspondingly leaves alkali free to form with iron sulfid more ferro sodium sulfids soluble in water. Furthermore, I have found that, if niter cake be used and the charge heated at 350° C. to 450° C., nearly the maximum yield of sulfur dioxid is obtainable, as per the following equation, viz:

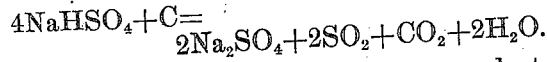

$$4NaHSO_4 + C = 2Na_2SO_4 + 2SO_2 + CO_2 + 2H_2O.$$

This constitutes a valuable by-product, and utilizable in subsequent treatment of the furnaced materials. On the other hand, by quickly heating the charge to temperatures between 650° C. and 825° C., which are, however, still below those of fusion, very little sulfur dioxid appears to be evolved.

In making up the furnace charge, I proportion the alkali sulfate to the titaniferous material in about the ratio of one part of ilmenite to from one to one and a half parts of salt cake, or the chemical equivalent of niter cake, according to the temperature and type of furnace employed. I also correspondingly vary the proportion and kind of reducing agent employed. Thus in a closed chamber or muffle type of furnace, I use: titaniferous ore (ilmenite) 100 parts, niter cake (sodium bisulfate) 210 parts, charcoal 65 parts. While in a revolving kiln, or barrel type furnace, I use: titaniferous ore (ilmenite) 100 parts, niter cake (sodium bisulfate) 210 parts, soft coal 125 to 175 parts.

Owing to the relatively low temperature, sintering, character of my process, it is desirable to so prepare and handle the charge as to secure the greatest possible extent and uniformity of contact between the constituent solid and semi-solid particles. To this end, I prefer to preliminarily grind the titaniferous ore to a fineness of from 100 to 200 mesh, and the reducing agent to pass 80 mesh, though the niter cake need only be ground to, say, 10 mesh because owing to its relatively low melting point, and the mechanical working of the charge, this constituent is comparatively easily homogeneously disseminated. The thus ground materials should be thoroughly mixed together before charging. I have, however, discovered that final products containing the least iron oxid are obtainable if the niter cake be first melted as in an open iron vessel at say 165° C. the titaniferous-ferruginous material, pulverized to about 100 mesh, be then added and the mixture digested at about 175° C. to 250° C. until the stiffening of the mass indicates near-completion of the reaction, after which the reducing agent is added and thoroughly incorporated by mixing. By thus treating the charge before furnacing proper, not only are the titaniferous-ferruginous particles very completely coated by the niter cake, thus insuring the desirable intimacy of contact, but combination of the available acid of the niter cake with the iron oxid is desirably promoted as indicated by the equation:

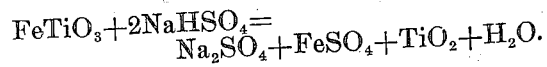

$$FeTiO_3 + 2NaHSO_4 = Na_2SO_4 + FeSO_4 + TiO_2 + H_2O.$$

Furthermore, as indicated by this equation, a large part of the water evolved is expelled during preparation of the charge as aforesaid, and the sulfur is so combined that the minimum quantity of sulfur dioxid (possible 4% to 5% of that in the charge corresponding to the available sulfuric acid of the niter cake) is evolved during the subsequent furnacing proper. Thus the maximum quantity of sulfur is rendered available to form water-soluble ferro-sodium sulfids. As to the furnacing proper, I find that satisfactory final products, useful for many purposes, are obtainable through heating the charge to temperatures as low as about 650° C., but to expedite the reactions, I prefer to heat at from 800° C. to 825° C., which latter temperatures, if maintained about two hours, will, without melting the charge, insure satisfactory occurrence of the required reactions. The thus furnaced material oxidizes with great rapidity if exposed to the atmosphere, and should accordingly be withdrawn into a closed chamber if cooling thereof before use is required. Even after such cooling, it is likely to ignite on exposure to the atmosphere. This characteristic is, however, not disadvantageous, since by discharging the material directly from the furnace into cold water to be employed in the subsequent step of heating with water for extraction of ferro-sodium sulfid and treatment with dilute acid, as per the aforesaid previous patented procedures, the furnace temperature of the material is utilized in heating the bath.

What I claim as new and desire to secure by Letters Patent is the following, viz:

1. In the treatment of a titaniferous-ferruginous material, the step which consists in heating said material in presence of sulfid of an alkali metal, at temperatures below that of fusion of the charge but sufficiently high to insure formation of ferro-sodium sulfid and titanate of the alkali metal.

2. In the treatment of a titaniferous-ferruginous material, the step which consists in heating together said material, a carbonaceous substance, and sulfate of an alkali metal, at temperatures below that of fusion of the charge, but sufficiently high to insure formation of ferro sodium sulfid and titanate of the alkali metal.

3. The method of obtaining titanic oxid from material containing it and iron oxid, which comprises heating said material in presence of sulfid of an alkali metal at temperatures below that of fusion of the charge, but sufficiently high to insure formation of ferro-sodium sulfid and titanate of the alkali metal, and treating the resulting sintered product in an acid solvent of the iron compounds present, but so diluted as to dissolve such iron compounds rather than those of titanium.

4. The method of obtaining titanic oxid from material containing it and iron oxid, which comprises heating said material in presence of a carbonaceous material and sulfate of an alkali metal, at temperatures below that of fusion of the charge, but sufficiently high to insure formation of ferro-sodium sulfid and titanate of the alkali metal, and treating the resulting sintered product in an acid solvent of the iron compounds present, but so diluted as to dissolve such iron compounds rather than those of titanium.

5. In the treatment of a titaniferous material, the steps which consist in preliminarily mixing said material with melted niter cake, digesting the mixture at from about 175° to 250° C. until acid of said niter cake has reacted with said material, intimately incorporating therewith a reducing agent, and thereafter heating the charge at temperatures below that of its fusion, but sufficiently high to insure formation of ferro-sodium sulfid.

LOUIS E. BARTON.

Witnesses:
B. C. POTTER,
T. C. GRAHAM.